United States Patent Office 2,871,270
Patented Jan. 27, 1959

2,871,270

PROCESS FOR THE EXTRACTION OF ALKALI METAL SALTS OF VANILLIN OR ITS HIGHER HOMOLOGUES FROM ALKALINE PROCESS LIQUORS

Gerrit Alberda, Amsterdam, Netherlands, assignor to N. V. Nederlandsche Combinatie voor Chemische Industrie, Amsterdam, Netherlands, a limited-liability company of the Netherlands No Drawing. Application November 4, 1957
Serial No. 694,070

Claims priority, application Netherlands
November 13, 1956

5 Claims. (Cl. 260—600)

This invention relates to methods of extracting alkali metal salts of vanillin or its higher homologues from alkaline process liquors.

It is known that in the production of vanillin or its higher homologues (e. g., ethylvanillin) there frequently takes place an oxidation in alkaline solution. Thus vanillin can be produced by alkaline oxidation of lignin-containing sulphite liquor, whilst moreover in the purely synthetic production of vanillin and its higher homologues an alkaline oxidation of an intermediate of the general formula

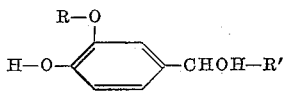

wherein R represents a lower alkyl group and R' represents a $CCl_3$— or a $COOH$-group, is carried out.

In both cases the alkali metal salt of vanillin or its higher homologues can be extracted from the aqueous alkaline solution obtained by certain alcohols, as for example 1-butanol (Marathon-Howard process, see Kirk-Othmer, Encyclopedia of Chemical Technology, vol. 14, page 606) or aqueous propanol or isopropanol.

It has now been found that the alkali metal salts of vanillin and its higher homologues are more efficiently extracted from alkaline solutions by using certain liquid organic bases as a solvent. For this purpose there have proved to be especially useful the following bases: the aliphatic secondary amines of the general formula $R_1R_2NH$, wherein $R_1$ and $R_2$ both represent the same, or each represents a different, saturated unbranched alkyl radical containing from 1 to 5 carbon atoms, aliphatic primary amines containing a branched chain alkyl group of 3 to 5 carbon atoms; hydrogenated 5 and 6 membered monocyclic heterocyclic bases, as for instance pyrrolidine, piperidine, and morpholine; and pyridine and its lower alkyl homologues. It is to be understood that throughout the present specification and claims the term "heterocyclic base" is used to denote only heterocyclic compounds which contain the basic nitrogen atom as a member of the heterocyclic ring.

In order to ensure a high efficiency in the extraction operation above mentioned the solvent should have not too low a boiling point and a good solubility in water. It is known that organic substances which are water-soluble can be made less soluble in aqueous media by the addition of an electrolyte to the aqueous solution. Since the electrolyte content of the process liquors involved in the present process is mostly very high, the water-solubility of the extraction liquid can be very pronounced, but will be low in the aqueous layer existing under practical conditions. It should be borne in mind, however, that the electrolyte content of the process liquors can be easily varied within certain limits by evaporation or by the addition of water.

Primary amines cannot normally be used in the method according to the present invention, since they react with vanillin and its higher homologues to form condensation products. Branched chain primary amines, however, such for example as isopropylamine, do not readily react with vanillin, probably on account of steric hindrance, and may therefore be used in the above described extraction process.

Preferably in carrying out the extraction process according to the invention a mixture of pyridine bases is used. This mixture is easily obtainable in large quantities and can be recovered in an easy manner.

The invention will be further explained by reference to the following examples, in which Examples 1 to 4 show the effects obtained in the case of the use of an imitation process liquid, whilst in Example 5 the real process conditions are employed. It will of course be understood that the invention is not restricted to these particular examples.

Example 1

To 600 cc. of a mixture of 100 parts of ethylvanillin, 70 parts of sodium hydroxide, 415 parts of sodium sulphate, 85 parts of sodium carbonate and 2250 parts of water, heated to about 50° C., there were added 100 cc. of either isopropanol, n-butanol, pure pyridine, or a mixture of pyridine bases, 90 percent of which had boiling points below 160° C. The mixture of the liquids was shaken, whereupon the liquids were allowed to settle, the aqueous layer and the organic layer were separated, and the contents of both layers with respect to ethylvanillin were determined. The following percentages of ethylvanillin were found when using the various extraction liquids specified below:

|  | aqueous layer | organic layer |
|---|---|---|
| isopropanol | 33 | 67 |
| n-butanol | 61.5 | 38.5 |
| pure pyridine | 16 | 84 |
| pyridine bases (90 percent boiling below 160° C.) | 20 | 80 |

Example 2

To 600 cc. of a mixture of 100 parts of vanillin, 70 parts of sodium hydroxide, 415 parts of sodium sulphate, 85 parts of sodium carbonate and 2250 parts of water, heated to about 50° C., there were added 100 cc. of either isopropanol, n-butanol, pure pyridine or a mixture of pyridine bases, 90 percent of which had boiling points below 160° C. The mixture was treated as described in Example 1 above. The following percentages of vanillin were found when using the various extraction liquids specified below:

|  | aqueous layer | organic layer |
|---|---|---|
| isopropanol | 40 | 60 |
| n-butanol | 83.5 | 16.5 |
| pure pyridine | 17 | 83 |
| pyridine bases (90 percent boiling below 160° C.) | 33 | 67 |

Example 3

To 600 cc. of a mixture prepared as in Example 1 there were added 100 cc. of either diethylamine, pyrrolidine, morpholine or isopropylamine, and the mixture was treated as described in that example. The following percentages of ethyl vanillin were found when using the various extraction liquids specified below:

|  | aqueous layer | organic layer |
|---|---|---|
| diethylamine | 13.5 | 86.5 |
| pyrrolidine | 9 | 91 |
| morpholine [1] | 26.5 | 73.5 |
| isopropylamine | 9.5 | 90.5 |

[1] In this case 40 cc. of 19 N sodium hydroxide solution were added in order to obtain separation of the two liquid layers. The temperature of the initial mixture was here 35° C.

*Example 4*

To 600 cc. of a mixture prepared as in Example 2 there were added 100 cc. of either diethylamine, pyrrolidine, aldehydine or monoethylaniline, and the mixture was treated as described in Example 1. The following percentages of vanillin were found when using the various extraction liquids specified below:

|  | aqueous layer | organic layer |
|---|---|---|
| diethylamine | 21 | 79 |
| pyrrolidine | 15 | 85 |
| aldehydine | 88 | 12 |
| monoethylaniline | 99 | 1 |

Aldehydine and monoethylaniilne are only sparingly soluble in water and therefore show bad results.

*Example 5*

A lignin-containing sulphite liquor was freed from sugars by treatment with calcium oxide, after which treatment the lignin-containing material was precipitated by the addition of alcohol. The precipitated lignin-containing material was dried and powdered, 20 grams of this material were added to a solution of 40 grams of copper sulphate in 175 cc. of water, and after the addition of 35 grams of sodium hydroxide in 50 cc. of water the mixture was heated to boiling in an autoclave, which was thereupon closed and kept at a temperature of about 160° C. for about 5 hours. After cooling, the contents of the autoclave were diluted with water to a volume of 250 cc. From this solution, each 25 cc. was extracted with 10 cc. of an organic solvent, of one or other of the kinds mentioned below, at a temperature of about 50° C. The vanillin content of each layer was then determined. In order to effect this the organic layer was evaporated in vacuo, the residue taken up in water, acidified, and extracted 10 times with ether. The ether solution obtained was extracted 5 times with an aqueous solution of sodium bicarbonate in order to remove acids, after which vanillin was obtained by extraction 10 times with alkali lye, followed by acidification and filtration of the extract. The vanillin present was precipitated as its 2,4-dinitro phenylhydrazone, dried and weighed. The aqueous layer, after acidification, was then treated in the same manner.

The results obtained are indicated in the following table in percentages of vanillin content when using the various liquids specified below as the organic solvent:

|  | aqueous layer | organic layer |
|---|---|---|
| isopropanol | 50 | 50 |
| n-butanol | 83 | 17 |
| pure pyridine | 26 | 74 |
| pyridine bases (90 percent boiling below 160° C.) | 10 | 90 |
| pyrrolidine | 45 | 55 |

What I claim is:

1. A process for extracting alkali metal salts of a compound having the formula

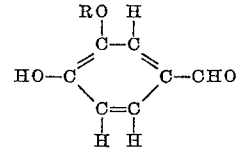

in which R represents the lower alkyl group from alkaline process liquors, which consists in using as an extracting solvent a substance selected from the group consisting of isopropylamine, diethylamine, pyrrolidine, morpholine, pyridine and pyridine bases, 90 percent of which boils below 160 degrees C. at atmospheric pressure.

2. A process for extracting the alkali metal salt of ethyl vanillin from an alkaline solution obtained by oxidation of an intermediate compound having the formula

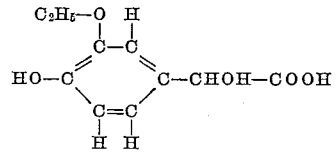

in which a substance selected from the group consisting of isopropylamine, diethylamine, pyrrolidine, morpholine, pyridine and pyridine bases, 90 percent of which boils below 160 degrees C. at atmospheric pressure, is used as an extracting solvent.

3. A process as in claim 2; wherein said substance used as an extracting solvent is a mixture of pyridine bases, 90 percent of which boils below 160 degrees C. at atmospheric pressure.

4. A process as in claim 1 wherein said alkaline process liquor is lignin-containing sulphite liquor.

5. A process as in claim 4; wherein said substance used as an extracting solvent is a mixture of pyridine bases, 90 percent of which has a boiling point below 160 degrees C. at atmospheric pressure.

References Cited in the file of this patent

UNITED STATES PATENTS

| 2,193,336 | Lecher et al. | Mar. 12, 1940 |
| 2,721,221 | Bryan | Oct. 18, 1955 |